United States Patent

Van Den Enden et al.

[11] Patent Number: 6,167,012
[45] Date of Patent: Dec. 26, 2000

[54] INFORMATION CARRIER, READING/ WRITING DEVICE AND READING DEVICE FOR WRITING AND/OR READING INFORMATION BLOCKS

[75] Inventors: Gijsbert J. Van Den Enden; Johannes H. M. Spruit, both of Eindhoven, Netherlands

[73] Assignee: U.S. Philips Corporation, New York, N.Y.

[21] Appl. No.: 09/500,303

[22] Filed: Feb. 8, 2000

Related U.S. Application Data

[63] Continuation of application No. 08/922,697, Sep. 2, 1997, Pat. No. 6,091,681.

[30] Foreign Application Priority Data

Sep. 3, 1996 [EP] European Pat. Off. .............. 96202456

[51] Int. Cl.[7] ...................................................... G11B 7/00
[52] U.S. Cl. ..................... 369/47; 369/275.3; 369/44.13; 369/48
[58] Field of Search .................................. 369/275.3, 48, 369/47, 44.26, 50, 44.13

[56] References Cited

U.S. PATENT DOCUMENTS 5,835,461  11/1998  Kobayashi et al. .................. 369/275.3

*Primary Examiner*—Nabil Hindi
*Attorney, Agent, or Firm*—Leroy Eason

[57] ABSTRACT

A disc-shaped information carrier has a track thereon which follows a helical or concentric path forming successive windings. For identifying each winding the information carrier also has a servo pattern thereon which includes position-information as well as synchronization elements. Such elements may be, for example, brief pulses in a continuous track wobble, and are distinguishable in adjacent windings based on a predetermined detectable parameter, such as alternating polarity or shifted relative phase positions. During recording by a read/write head a system control detects the synchronization elements and monitors whether a deviation has occurred signifying that the read/ write head has wandered to an adjacent winding. In that event recording is interrupted. Thus, the least possible information in adjacent windings is overwritten in the case of disturbances resulting from shocks or defects of the information carrier. A read device is also described which interrupts reading if the winding identification provided by the synchronization elements signifies erroneous operation.

4 Claims, 4 Drawing Sheets

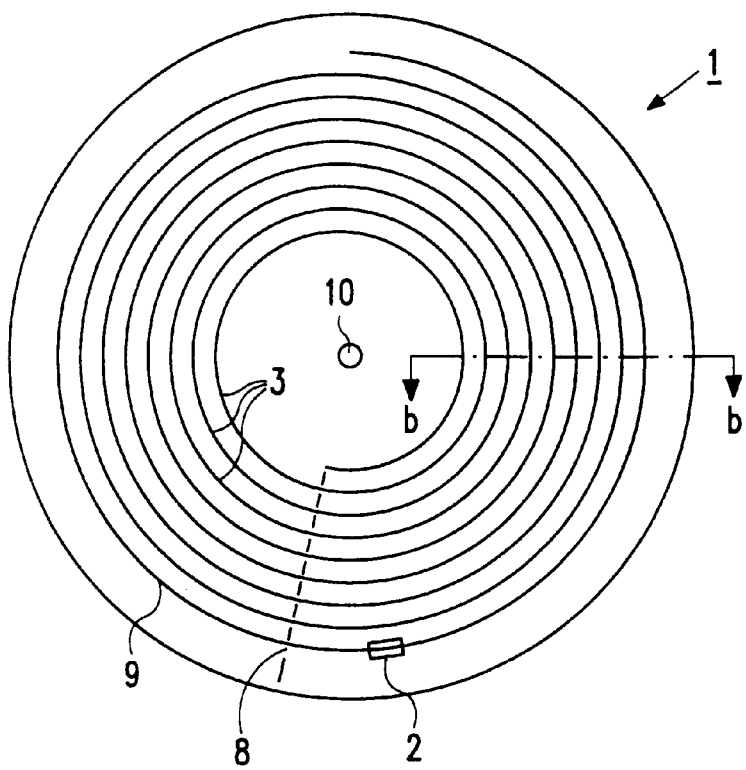
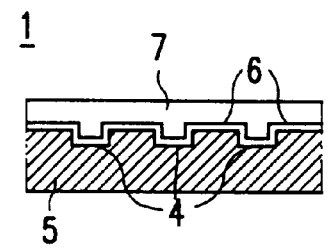
FIG. 1b
FIG. 1a
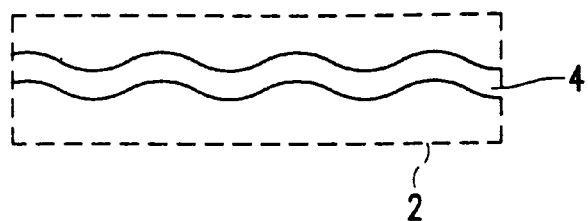
FIG. 1c
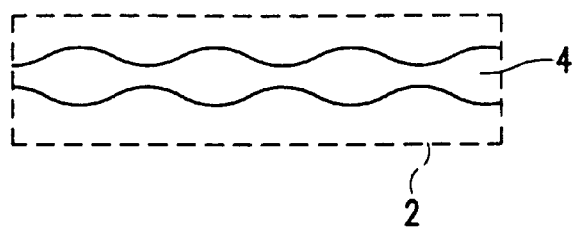
FIG. 1d

INFORMATION CARRIER, READING/ WRITING DEVICE AND READING DEVICE FOR WRITING AND/OR READING INFORMATION BLOCKS

This appln is a con of Ser. No. 08/922,697 Sep. 2, 1997 now U.S. Pat. No. 6,091,681.

BACKGROUND OF THE INVENTION

1. Field of the Invention

The invention relates to an information carrier for writing and/or reading information blocks in/from a track intended for recording and arranged in a helical or concentric pattern of windings, the track being determined by a servo pattern on the information carrier, the servo pattern comprising synchronization elements and a modulation, in which modulation position-information is coded.

The invention further relates to a reading/writing device comprising reading/writing means for reading and/or writing information blocks from/in an information carrier track intended for recording, the track being arranged in a helical or concentric pattern of windings, and determined by a servo pattern on the information carrier. The servo pattern comprises synchronization elements and a is modulated with coded position-information is coded. The device has a read/write head for scanning the track and a system control for controlling the scanning in dependence on the synchronization elements.

The invention further relates to a reading device comprising reading means for reading information blocks from a track on an information carrier, the track being arranged in a helical or concentric pattern of windings and the track being determined by a servo pattern on the information carrier, the servo pattern comprising synchronization elements, the device comprising a read head for scanning the track and a system control for controlling the scanning.

2. Description of the Related Art

An information carrier and a device of the type defined in the opening paragraph for reading and/or writing information thereon are known from U.S. Pat. No. 4,901,300, issue Feb. 13, 1990, assigned to Philips. The information is coded to form an information signal which may be subdivided into addressable information blocks as on a CD-ROM. The information carrier has a pregroove for producing tracking servo signals, the radial position of which pregroove periodically varies in a so-termed wobble. The device comprises a read/write head for scanning the track. During the scanning, this wobble causes a modulation of the tracking servo signals. This modulation comprises code modulation synchronization elements and position-information which position-information denotes the absolute length of the track from the starting point. The information blocks are recorded on the information carrier at a desired position that corresponds to their address, the position of the read/write head in the track being derived from the position-information. The writing of the information blocks is synchronized with the synchronization symbols.

A problem for such a system is that the read/write head may wanders off the track and cause information in an adjacent track to be destroyed as a result of a defect or a shock during writing.

SUMMARY OF THE INVENTION

It is an object of the invention, to provide detection means for detecting in an easy and rapid fashion whether the read/write head has wandered off the track. For this purpose, an information carrier according to the invention is characterized in that the synchronization elements in adjacent windings can be distinguished in a predetermined manner. Thereto, a reading/writing device according to the invention is characterized in that, while the synchronization elements (35, 36) in adjacent windings are predeterminably distinguishable, the system control (46) is arranged for distinguishing synchronization elements (35, 36) of an adjacent winding if the adjacent winding is erroneous scanned during the writing of an information block, and for interrupting the writing if such erroneous scanning takes place. The invention is advantageous, for example, in that destruction of information in an adjacent track is limited. A reading device according to the invention is characterized in that, while the synchronization elements (35, 36) in adjacent windings are predeterminably distinguishable, the system control (46) is arranged for distinguishing synchronization elements (35, 36) of an adjacent winding if that winding is erroneous scanned during the reading of an information block, and for interrupting the reading if such erroneous scanning takes place. This is advantageous in that the reading of unwanted information is restricted.

These and other aspects of the invention are apparent from and will be elucidated with reference to the embodiments described hereinafter.

BRIEF DESCRIPTION OF THE DRAWINGS

In the drawings:

FIGS. 1a–1d show an information carrier which has a servo pattern,

Figure elements corresponding to elements already described carry like reference characters.

DESCRIPTION OF THE PREFERRED EMBODIMENTS

Figure 2:
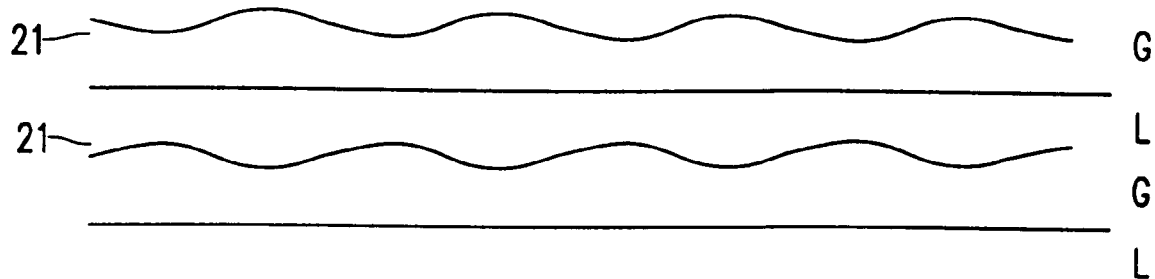
FIG. 2 shows a land/groove servo pattern.

FIG. 1a shows a disc-shaped information carrier 1 having a track 9 intended for recording, which track is arranged in a helical pattern of windings 3. The windings may also be arranged concentrically instead of helically. The track 9 on the information carrier is indicated by a servo pattern such as, for example, a pregroove 4 which enables a read/write head to follow the track 9 during scanning. A servo pattern may also be formed, for example, by regularly spread sub-patterns which, in the servo tracking system, periodically cause tracking signals to occur. FIG. 1b shows a cross-section along a line b—b of the information carrier 1, in which a transparent substrate 5 is covered by a recording layer 6 and a protective layer 7. The pregroove 4 may also be arranged as a land or other material property that differs from its environment. Furthermore, the servo pattern may also be formed by alternately raised and depressed windings, forming so-called land and groove patterns, with a transition from land to groove or vice versa in each winding. The recording layer 6 can be written optically, magneto-optically or magnetically by an apparatus for reading and/or writing information such as the known CD Recordable or hard disk for computer use. The FIGS. 1c and 1d show two examples of a periodic modulation (wobble) of the pregroove. This wobble causes an additional signal to arise in a servo tracking detector. The wobble is, for example, frequency modulated and in the modulation position-information is coded, such as an address or a time code. A description of an inscribable CD system comprising position-information obtained in such manner can be found in U.S. Pat. No. 4,901,300 (PHN 12398) and U.S. Pat. No. 5,187,699 (PHQ 88002) both assigned to Philips. Another example of position-information modulation are header symbols included in the servo pattern, which header symbols are indicative of an address and indicate the beginning of the area for recording an information block.

FIG. 2 shows a land/groove pattern in which a wobble 21 is introduced on one side in which, for example, from the inside out (from the bottom up in FIG. 2) a land/groove (L/G) transition is straight and a groove/land (G/L) transition shows a wobble. The same wobble signal is then developed in land and groove, but since it is also known whether a land or a groove is scanned, the winding can be determined unambiguously.

On the information carrier according to the invention, windings 3 in the area intended for recording contain winding information which indicates, for example, the radial position of the winding such as, for example, a winding number and/or sector addresses. A winding number, for example, counts up from 0 from the innermost winding outward. The winding information may also denote a distance to the center of rotation. For decoding the winding information, it is advantageous for the modulation of the pregroove to have a pattern such that a constant frequency evolves during reading, irrespective of the radial position. With a simple filter it is possible to separate well a modulated signal having a constant frequency from noise signals. For this purpose, the period of the space modulation preferably increases proportionally with the distance to the center of rotation 10. As a result, a constant angular velocity of the information carrier produces to a constant modulation frequency. Alternatively, another pattern of the space modulation period and a linked pattern of the angular velocity may be selected. For verifying the exact winding after a jump, it is advantageous for the winding information to be repeated several times per winding in winding information frames. Such winding information frames are to be decodable independently. This also provides a good protection against local damage. It is advantageous to number the winding information frames sequentially with segment numbers, so that always an indication is available of the angular position relative to the reference line 8, where the winding numbers increase for a helical track, or where the transitions take place at a land/groove.

Figure 3A:
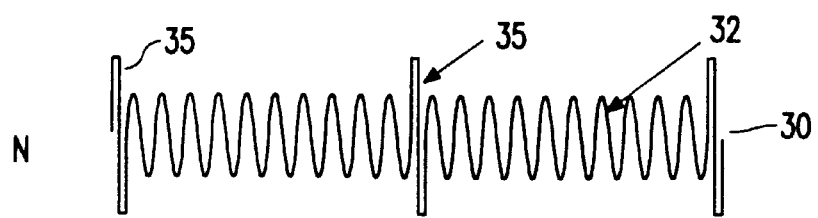
FIGS. 3A–3C show a modulation in adjacent windings.
Figure 3A:
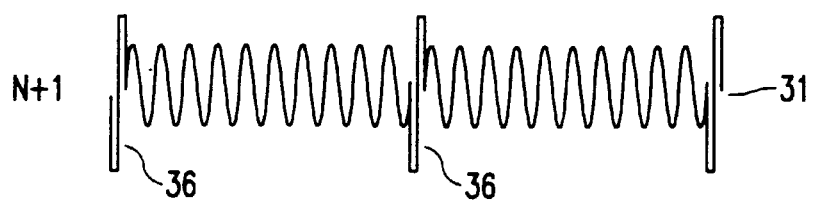
Figure 3B:
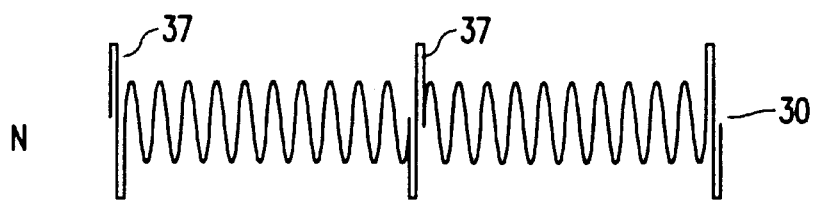
Figure 3B:
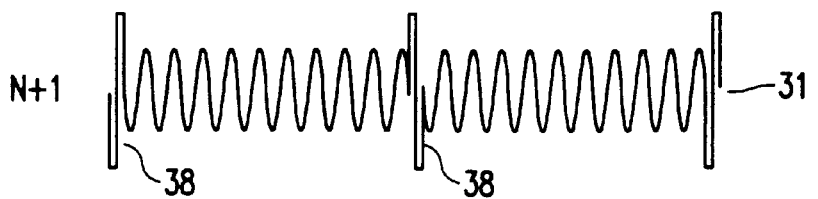
Figure 3C:
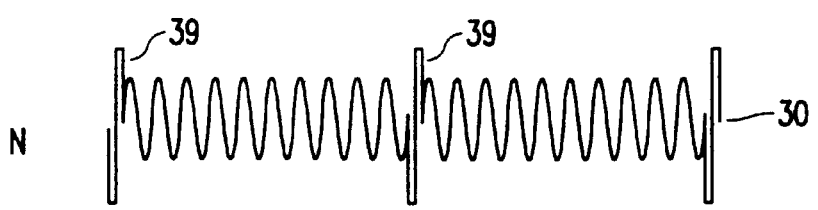
Figure 3C:
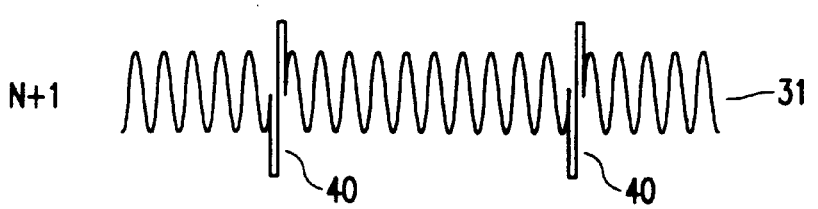

FIGS. 3A–3C diagrammatically show the modulation of a servo pattern according to the invention. This modulation may be realized as pregroove wobble on the information carrier as described in FIG. 1. The modulation 30, 31 is shown in two adjacent windings N and N+1 (or winding pairs in the case of L/G shown in FIG. 2). The modulation has a wobble 32 with a relatively long period and has synchronization elements 35, 36, 37, 38, 39, 40 with a relatively short period. The amplitude of the synchronization elements is also larger than the amplitude of the wobble 32. This is advantageous in that the synchronization elements are easy to detect. The synchronization elements may also be modulated in a different manner, such as, for example, a phase jump in the wobble. The synchronization elements may be used for synchronizing the writing and/or reading, such as controlling the rotation or scanning velocity of the information carrier, inserting the information blocks in the track at a precisely determined position on the information carrier, or reading the position-information from the wobble of the servo pattern. The combination of the wobble and the synchronization elements permits information to be recorded in blocks in a simple manner, even if information has already been recorded in track where the new information is to join.

FIG. 3a shows an embodiment of the invention in which the synchronization elements in adjacent tracks always have an alternating polarity. The synchronization elements 35 in the winding N continue to have the same, for example, positive polarity, whereas the synchronization elements 36 in the adjacent winding N+1 always have a different, for example, negative polarity. Obviously, this pattern is repeated, so that track N−1 is again equal to track N+1. The synchronization elements 37 in the winding N in FIG. 3b have an ever alternating polarity, whereas the corresponding synchronization elements 38 in the adjacent winding N+1 always have the different, opposite polarity. In the embodiment shown in FIGS. 3a and 3b, the synchronization elements in adjacent windings are always aligned. FIG. 3c shows a fixed shift between adjacent windings over half the distance between synchronization elements in lieu of aligned synchronization elements. In that case, the detection of the winding jump can be derived from the instant at which a synchronization element is read. This is advantageous in that an error is established more rapidly for an equal number of synchronization elements (as a result of the lack of or early appearance of a synchronization element). If, for example, one third of the distance is considered a shift, it is also possible to detect an undesired jump over two windings. Obviously, further patterns of shifts are possible, possibly combined with the use of various types of synchronization elements. Alternatively, a different number of synchronization elements (and thus a different distance between them) may be used per winding. In lieu of the different polarities, it is also possible to use various types of synchronization elements which comprise, for example, two short and two long pulses in different sequences.

With the above different synchronization elements, distances and shifts it is possible to form a recurrent pattern of distinguishable differences over the number of tracks, by which also an undesired displacement over various tracks and/or the direction of the displacement can be detected.

While such an information carrier according to the invention is being written, it is easy to detect whether a read/write head is positioned over the correct track or over an adjacent track. Since always the instant and the polarity of the next synchronization element is known, an undesired jump to an adjacent winding can be detected when an erroneous synchronization element is found. The writing operation can then be interrupted immediately so as to damage the least possible data in an adjacent winding by overwriting. A next synchronization element may be waited for, and the writing will not be interrupted until after a recurrent error. It is also possible to combine the detected information with information from the servo system in which system often track-loss information can also be derived. Combining servo track-loss information with synchronization element detection information enhances the reliability of the detection of undesired displacements of the read/write head.

The synchronization elements are desirably recorded in the servo pattern at regular intervals. This provides a relatively fast detection of an undesired displacement of the read/write head. Preferably, the mutual distance of synchronization elements in adjacent tracks is smaller than the length of an information block, so that at most this distance can be overwritten erroneously. In a reading/writing system in which the information is protected by an error correction code, the maximum length of the track that can be written erroneously is desirably selected smaller than the maximum burst error to be corrected. The distance between the synchronization elements and the number of erroneous detections thereof necessary for interrupting the writing operation can be adjusted to this.

It is observed that the pattern of synchronization elements per winding of a helical track may differ. At a certain angular position, there will thus be an exchange of patterns as denoted along the imaginary line 8 in FIG. 1*a*.

Figure 4:
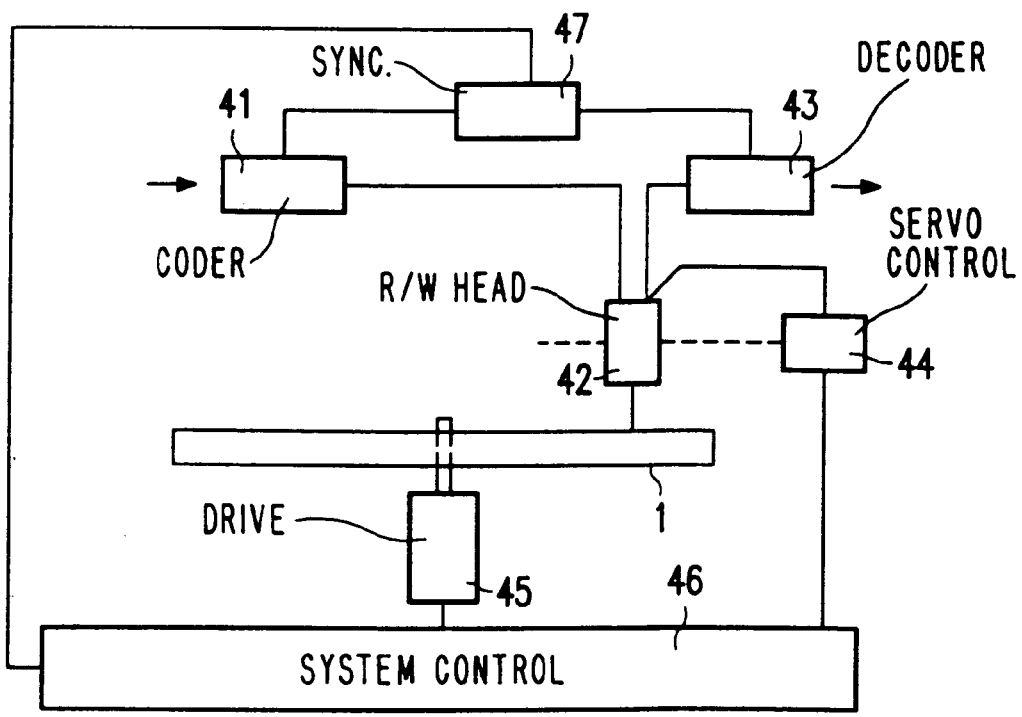
FIG. 4 shows a reading/writing device for reading and/or writing information blocks.

FIG. 4 shows a device for writing and reading information blocks on a disc-shaped information carrier which can be written magneto-optically or optically (via phase change). The device comprises drive means 45 for causing the information carrier to rotate and a read/write head 42 for scanning the track indicated on the information carrier by the servo pattern. The read/write head 42 is positioned on the track in radial direction by servo control unit 44. The read/write head scans the track with known tracking and focusing methods and a modulation caused, for example, by the wobble in the pregroove is present in the servo signals. The servo signal is demodulated and the position-information coded therein is recovered in the servo control unit 44 and passed on to the system control 46. The radial position of the read/write head may be checked via the recovered position-information. The information applied to the input of the coding unit 41 is divided into blocks, as required, and converted into a writing signal for the read/write head 42. The coding unit 41 comprise, for example, an error coder and channel coder. During the reading operation, the signal from the read/write head 42 is reconverted into the information in the decoding unit 43 comprising, for example, a channel decoder and an error corrector. The device comprises synchronization a unit 47 for synchronizing the writing and reading operations. The timing of the writing is then customarily controlled in dependence on the recovered synchronization elements. The system control 46 controls the synchronization unit 47 and, in addition, the servo control 44, the coding unit 41, the decoding unit 43 and the drive means 45 and is arranged for executing the procedures to be described hereinafter.

When an information carrier 1 has been inserted into the device and a writing instruction has been received, the system control 46 positions the read/write head 42 over the desired winding and the writing is started at the correct instant, for example, synchronized with a first synchronization element. The pattern of the synchronization elements in the track to be written is known, however. The system control is arranged according to the invention for detecting a second synchronization element of a certain type and/or a synchronization element at a certain moment, and subsequently, further synchronization elements. However, if a synchronization element or a wrong type of synchronization element is detected at another instant that means that the read/write head 42 has wandered off to an adjacent winding as a result of a shock or a defect, and the system control will interrupt the writing operation. An example of a pattern of aligned synchronization elements in adjacent windings is shown in FIG. 3*b*. The polarity of the successive synchronization elements in the track to be written then alternates. If the system control detects the same polarity twice in succession, that signifies that the read/write head has wandered off to an adjacent winding. FIG. 3*c* shows a pattern of shifted synchronization elements. If the system control 46 detects a synchronization element too early, or does not find a synchronization element at the expected instant, that means that the read/write head will have wandered off to an adjacent track. When, for example, 4 different types of synchronization elements are used in a pattern which recurs every 4 windings, the system control will detect the error even with an undesired displacement over a maximum of 3 windings, because it detects an unexpected type. In an embodiment of the system control the writing will not be stopped until the second or further unexpectedly detected synchronization elements has occurred. This is advantageous in that a single synchronization element erroneously detected as faulty does not immediately lead to an interruption of the writing process. A further embodiment of the system control also evaluates the servo signals and derives therefrom information about track loss in known manner. This information may be combined with the unexpectedly detected synchronization elements. A decision to interrupt may then be made both in the case of a track loss indication and an erroneous synchronization element. This is advantageous in that the reliability of the decision is enhanced, because the two indications are formed independently.

Figure 5:
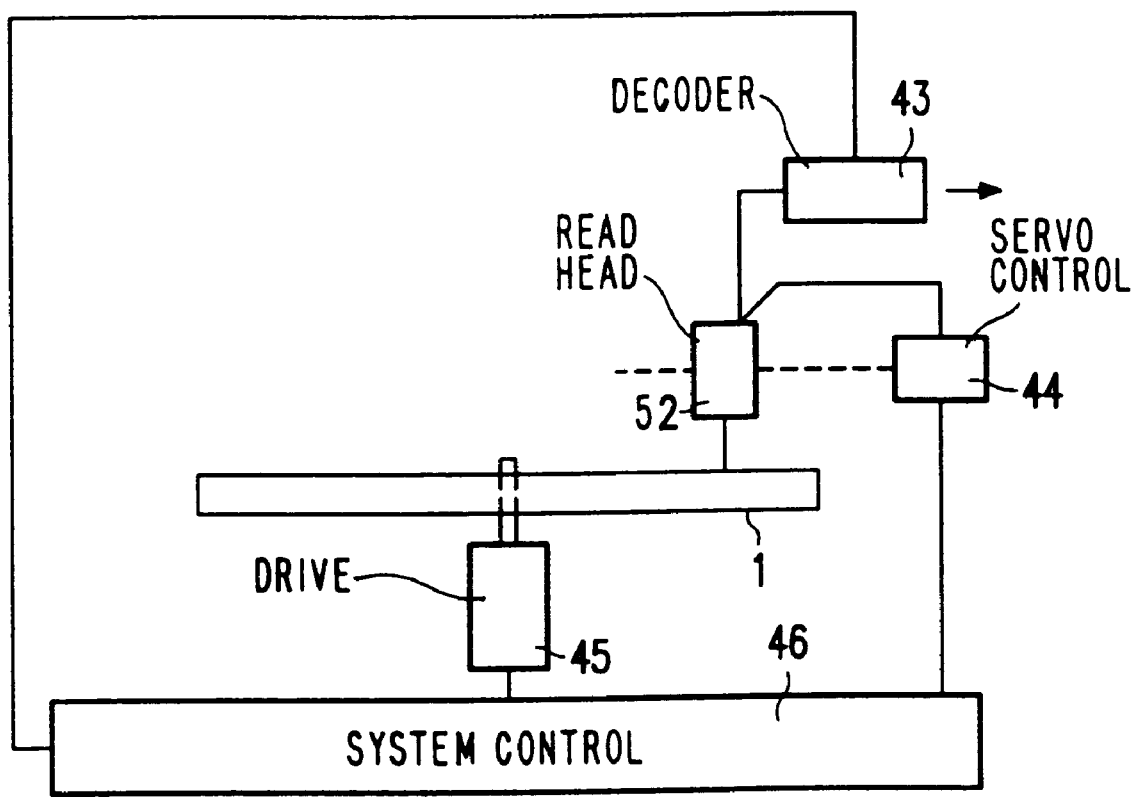
FIG. 5 shows a reading device.

FIG. 5 shows a reading device according to the invention by which an information block can be similarly read. The reading device comprises drive means 45 for causing the information carrier 1 to rotate and a read head 52 for scanning the track on the information carrier. The read head 52 is positioned in radial direction on the track by servo control unit 44. Furthermore, the device comprises a system control 46. During the reading operation, the signal from the read head 52 is converted into the information in the decoder unit 43 which comprises, for example, a channel decoder and an error corrector. In the embodiment according to the invention, the system control 46 detects the synchronization elements during the reading operation. In the event of a deviation, the reading may be interrupted. A control signal may be sent to the servo control unit 44, as required, so that a jump is made back in the direction of the desired winding, provided that this direction can be derived from the detected synchronization element (the pattern is different over more than 2 adjacent windings) and/or from the variation of the servo signals. Furthermore, the system control can, after an interruption, directly carry out a repetition and cause the desired track to be read out once again.

What is claimed is:

1. An information carrier having a recording track which follows a helical or concentric path forming successive windings and which is adapted to have information recorded thereon in the form of successive information blocks, the track path being determined by a servo pattern on the information carrier;

said servo pattern comprising:
   (i) a modulation of a predetermined detectable physical parameter of the track path in accordance with coded position information, and
   (ii) periodic synchronization pulses, the pulses in adjacent track windings being distinguished from each other based on a predetermined substantially fixed difference in at least one predetermined detectable physical parameter of said pulses.

2. An information carrier as claimed in claim 1, wherein the synchronization pulses in adjacent windings are aligned but differ in phase.

3. An information carrier as claimed in 1, wherein the modulation of a predetermined physical parameter of the track path comprises a periodic transverse variation of the radial displacement of a pregroove in the information carrier, which pregroove constitutes the track path, and the synchronization pulses are in the form of a short interruption of the pregroove modulation during each period thereof.

4. An information carrier as claimed in claim 1, having recorded thereon an information pattern in the form of successive information blocks.

\* \* \* \* \*